(12) United States Patent
Remy et al.

(10) Patent No.: US 11,608,742 B2
(45) Date of Patent: Mar. 21, 2023

(54) ROTOR ASSEMBLY, ASSOCIATED METHOD OF ASSEMBLY, AND COMPUTER PROGRAM PRODUCT THEREFOR

(71) Applicant: PRATT & WHITNEY CANADA CORP., Longueuil (CA)

(72) Inventors: Patrice Remy, St-Hubert (CA); Pierre Gaudet, Montreal (CA); Jiemin Wang, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 558 days.

(21) Appl. No.: 16/592,176

(22) Filed: Oct. 3, 2019

(65) Prior Publication Data

US 2021/0102465 A1    Apr. 8, 2021

(51) Int. Cl.
*F01D 5/02*  (2006.01)
*F01D 21/00*  (2006.01)

(52) U.S. Cl.
CPC ........... *F01D 5/025* (2013.01); *F01D 21/003* (2013.01); *F05D 2230/60* (2013.01); *F05D 2260/37* (2013.01); *F05D 2260/83* (2013.01); *F05D 2270/304* (2013.01); *F05D 2270/334* (2013.01)

(58) Field of Classification Search
CPC ............ F01D 5/06; F01D 5/027; F01D 5/025; F01D 21/003; F01D 25/04; G01M 1/16; G01M 1/12; G01M 1/30; G01M 15/14; F05D 2260/83; F05D 2270/304; F05D 2260/81; F05D 2270/334; F05D 2240/60; F05D 2260/37; F05D 2230/60; Y02T 50/60

USPC ........................................... 310/89; 29/889.21
See application file for complete search history.

(56) References Cited

U.S. PATENT DOCUMENTS

| | | | | |
|---|---|---|---|---|
| 5,214,585 A | * | 5/1993 | Ehrich | F16F 15/322 73/462 |
| 5,537,814 A | * | 7/1996 | Nastuk | F01D 5/066 60/805 |
| 7,877,223 B2 | | 1/2011 | Lee et al. | |
| 8,540,482 B2 | * | 9/2013 | Malmborg | F01D 5/025 416/198 A |
| 8,567,060 B2 | * | 10/2013 | Calvert | B21K 3/04 702/147 |
| 8,631,575 B2 | * | 1/2014 | Walters | B23P 15/006 702/147 |
| 9,206,692 B2 | * | 12/2015 | Calvert | B23P 19/04 |
| 9,604,322 B2 | * | 3/2017 | Walters | B23P 15/006 |
| 9,932,832 B2 | | 4/2018 | Wang et al. | |
| 10,274,393 B2 | | 4/2019 | Rix | |
| 2009/0320286 A1 | * | 12/2009 | Walters | F01D 5/027 29/889 |

(Continued)

Primary Examiner — Alex W Mok
(74) Attorney, Agent, or Firm — Norton Rose Fulbright Canada LLP (57) ABSTRACT

The method of assembling the rotor assembly can include obtaining geometrical reference values about the individual rotor components, based on the geometrical reference values, determining a combination of relative circumferential positions of the individual rotor components associated to a bow shape configuration of the centers of mass along the axially-extending sequence; and assembling the rotor components to one another in said determined combination of relative circumferential positions, into the rotor assembly.

15 Claims, 5 Drawing Sheets (56) References Cited

U.S. PATENT DOCUMENTS

| | | | |
|---|---|---|---|
| 2013/0170947 A1* | 7/2013 | Kurt-Elli | G01H 1/006 |
| | | | 415/13 |
| 2013/0247378 A1* | 9/2013 | Walters | F01D 5/027 |
| | | | 29/889.2 |
| 2014/0173899 A1* | 6/2014 | Walters | F01D 5/027 |
| | | | 29/889.21 |
| 2018/0073428 A1* | 3/2018 | Morgan | F02C 7/36 |

* cited by examiner

ROTOR ASSEMBLY, ASSOCIATED METHOD OF ASSEMBLY, AND COMPUTER PROGRAM PRODUCT THEREFOR

TECHNICAL FIELD

The invention relates generally to methods for balancing assemblies of rotary components and in particular, high speed rotor assemblies such as those in gas turbine engines.

BACKGROUND OF THE ART

It is routine for gas turbine engines to have to pass stringent vibration acceptance tests during production. Rotor eccentricities due to micro geometric errors on parts are a main source of engine vibration, and eccentricities can be alleviated by rotor balancing. Rotor assemblies include a plurality of rotor components such as compressor, shaft and turbine components, in an axially extending stack. Balancing is the act of aligning the centers of mass of the individual components of the rotor assembly with the virtual rotation axis of the rotor assembly. No alignment is ever perfect due to physical limitations and tolerances in the individual components. However, excessive eccentricity can lead to significant vibrations. If an engine does not pass the vibration acceptance limit, it typically must be disassembled, re-balanced, and reassembled, at a cost of time and resources. Some engines are designed in a manner to allow strategic removal of material at some locations to "balance" the rotor, which can help reduce occurrences where the rotor must be entirely disassembled, but this approach requires designing rotor components with additional weight which can then optionally be removed, and the additional weight remains on the engines when it is not removed, which is particularly undesirable in aircraft engines. Alternately, some engines are designed in a manner to allow strategic addition of weight at some locations, typically referred to as balancing planes which are perpendicular to the rotation axis, but here again, this requires designing the components in a manner to allow weight addition, which can render them suboptimal from other points of view, and when weight is added, the resulting assembly maintains the added weight during operation. Accordingly, there remained room for improvement.

SUMMARY

In one aspect, there is provided a method of assembling a rotor assembly of a gas turbine engine, the rotor assembly including at least three rotor components assembled to one another in an axially-extending sequence, each rotor component having a center of mass, the method comprising: obtaining geometrical reference values about the individual rotor components; based on the geometrical reference values, determining a combination of relative circumferential positions of the individual rotor components associated to a bow shape configuration of the centers of mass along the axially-extending sequence; and assembling the rotor components to one another in said determined combination of relative circumferential positions, into the rotor assembly.

In another aspect, there is provided a computer program product containing computer-readable instructions, which, when operated upon by a computer, performs the following method: determining a combination of relative circumferential positions of the individual rotor components associated to a bow shape configuration of the centers of mass along the axially-extending sequence based on geometrical reference values concerning individual rotor components each having a center of mass and configured to be assembled to one another in an axial sequence to form a rotor assembly, the geometrical reference values being stored in a computer readable memory accessible to the computer.

In a further aspect, there is provided a rotor assembly comprising at least three rotor components assembled to one another in an axially-extending sequence, each rotor component having a center of mass, wherein the centers of mass of the rotor components forms a bow shape configuration along the axially-extending sequence.

DESCRIPTION OF THE DRAWINGS

Reference is now made to the accompanying figures in which.

DETAILED DESCRIPTION

Figure 1:
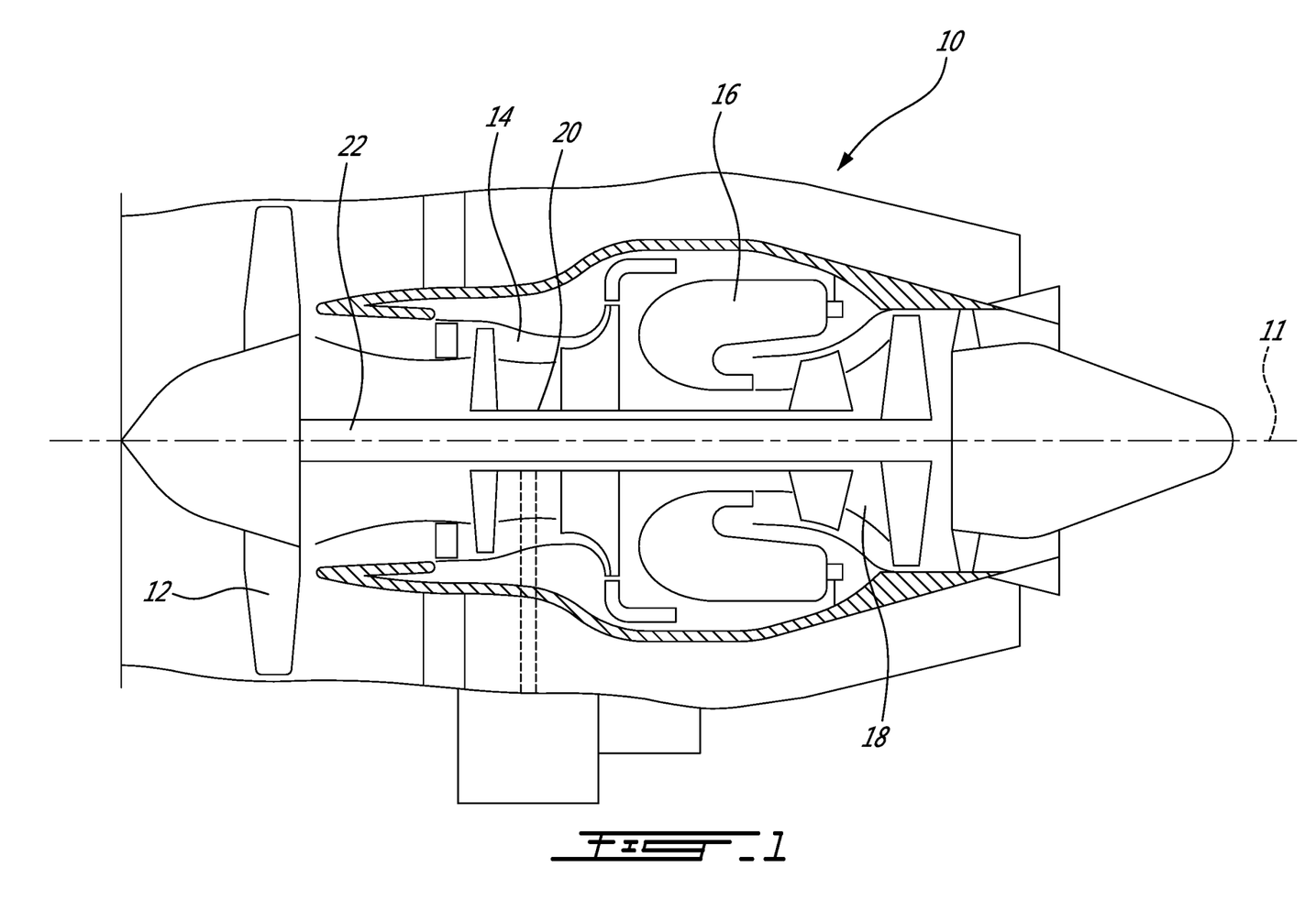
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 is a turbofan engine. Turbofan engines, and other types of gas turbine engines such as turboprop, turboshaft, APU, etc., can include one or more rotor assemblies. A rotor assembly can include a plurality of rotor components such as compressor stage(s), shaft section(s), turbine stage(s), which are assembled axial-end to axial-end into the resulting assembly. The resulting rotor assembly, which can be a high pressure rotor assembly 20 or a low pressure rotor assembly 22, thus has a rotation axis 11. The assembly process typically involves compressing the stack of rotor components, which can have a succession of male and female members press-fitted into one another, for instance, and interference fits and curvic connectors can be used between successive components.

Figure 2A:
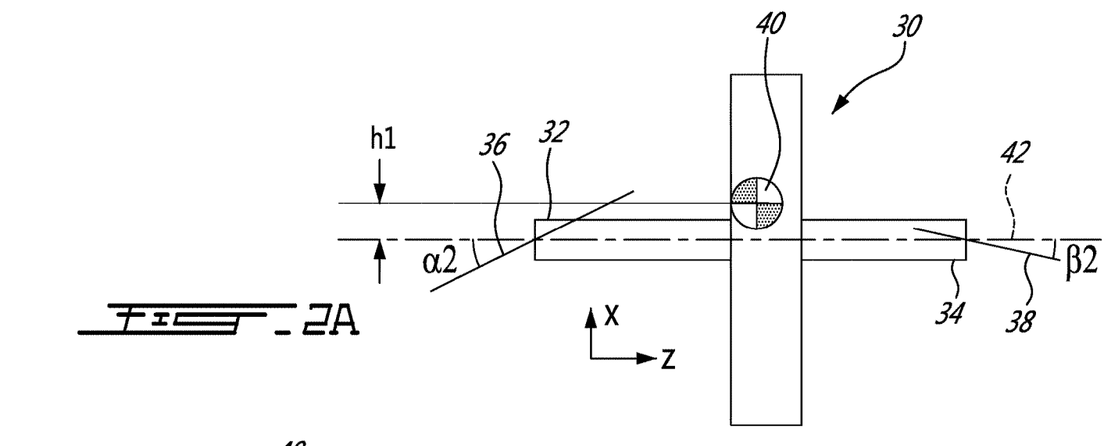
FIGS. 2A, 2B and 2C are top, side and front elevation views of a schematic rotor component, respectively.
Figure 2B:
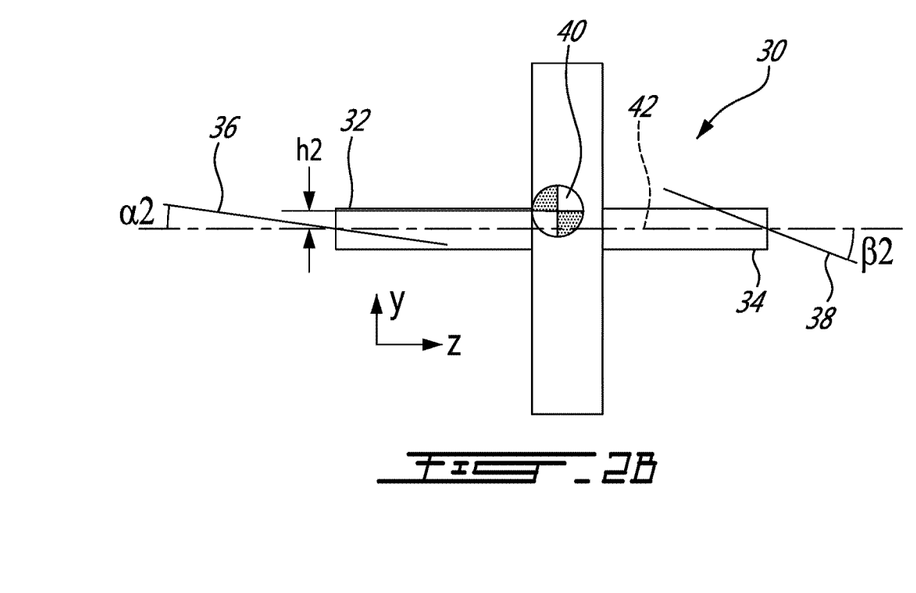
Figure 2C:
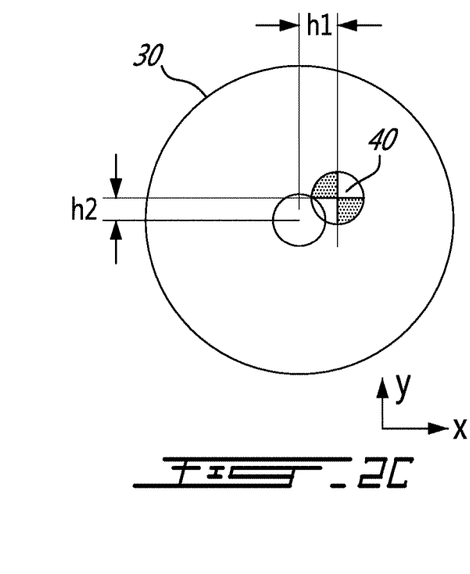

FIGS. 2A and 2B schematize one such rotor component 30 which can be assembled with other rotor components into an axial sequence to form a rotor assembly, also referred to as a spool. Each rotor component 30 typically has one mating member 32, 34 at each one of its two opposite axial ends, and a center of mass 40, which, by contradistinction with the center of mass of the overall rotor assembly, will be referred to herein as the intrinsic center of mass 40. The rotor component 30 is designed for its intrinsic center of mass 40 to coincide with its intrinsic rotation axis 42, but in practice, there will typically be a measurable offset distance $h_1$, $h_2$, referred to commonly as a "runout", between the center of mass 40 and the geometrical axis 42 of the component 30.

The mating members 32, 34 typically have a solid of revolution shape, and can be cylindrical for instance, though some can include more complex designs, such as a crenelated tips to form a curvic coupling for instance. Theoretically, each mating member 32, 34 has its own geometrical axis, which is designed to coincide, as closely as feasible, with the axis 42 of the rotor component 30. However, in practice, the axes 36, 38 of the mating members 32, 34 can be slightly inclined relative to the axis 42 of the rotor component 30 such as can occur due to manufacturing tolerances, for instance. As such, each mating member 32, 34 can be said to have a slight, though possibly measurable, wedge angle $\alpha$, $\beta$. These angles $\alpha$, $\beta$ are tri-dimensional and can therefore appear different when projected on a Top view plane (FIG. 2A) $\alpha_2$, $\beta_2$ or when projected on a Side view plane (FIG. 2B) $\alpha 1$, $\beta 1$.

For the purpose of the following explanation, it can be practical to attribute the label Z to the (horizontal) rotor axis, the label X to the transversal horizontal axis, and the label Y to the vertical axis, although it will be understood that any alternate form of virtual reference system found suitable can alternately be used. Accordingly, the projection of the wedge angle $\alpha$, $\beta$ of a given mating member 32, 34 can be different in the X-Z plane than in the Y-Z plane. It will be understood that even if the rotor component 30 had one of its mating members 32, 34 fitted with a theoretically perfect receiving member, i.e. a receiving member having an axis perfectly aligned with the rotor assembly's axis, the presence of the wedge angle (e.g. $\alpha$) of the rotor component 30 would lead to an inclination of the rotor component's axis 42 relative to the rotor assembly's axis 11, causing a resulting offset, or runout, between the center of mass 40 of the rotor component 30 and the rotor assembly's axis 11. This resulting offset is caused by the wedge angles $\alpha$, $\beta$ in the mating member 32 and in the member which receives it (which typically has a wedge angle as well), and is independent of the intrinsic offset h between the center of mass of the rotor component 30 and its intrinsic geometrical axis 42.

In practice, the intrinsic offset h between the center of mass of the rotor component and its geometrical axis 42 can alleviate or amplify the extent of the offset stemming from the wedge angle $\alpha$, and of the wedge angle $\beta$ of the member which receives the mating member 32, depending on the relative orientations between the center of mass offset h, the wedge angle $\alpha$, and the wedge angle of the member which receives the mating member 32. The total offset in the resulting assembly, i.e. the sum of the offset caused by the mating wedge angles and of the intrinsic offset h of the center of mass 40, will depend on the relative circumferential orientations between the rotor component 30 and the rotor component which receives its mating member 32, and can further depend on the specifics of the overall assembly.

Indeed, the wedge angle $\alpha$ and the wedge angle $\beta$ of a receiving rotor component can be additive or subtractive, depending on the relative circumferential orientations. That is, if the receiving rotor component has a wedge angle $\beta$ which tends to offset the center of mass of the received rotor component upwardly, this offset can be amplified, or to the contrary, partially, fully, or over-compensated, depending on the amplitude of the wedge angle $\alpha$ of the received component, and the relative circumferential orientations between the two assembled components. The wedge angles $\alpha$, $\beta$ and the offset h can, be accurately measured, and the orientation of the wedge angles of the received rotor component can be changed, in the final assembly, by rotating, or "clocking", the received rotor component 30 around its geometrical axis 42, to a circumferential position determined to achieve this compensating effect, relative to the circumferential orientation of the receiving component and its mating wedge angle $\beta$, before assembling it to the receiving component. In any event, it will be understood that even if it is aimed to fully cancel out the offset between the center of mass 40 of the received rotor component 30 and the virtual rotation axis 11 of the overall rotor assembly (e.g. 20 or 22), this cancelling out will, in practice, be imperfect and there will remain an offset, or runout, between the received rotor component 30 and the rotation axis 11 of the rotor assembly.

It will be understood that the same phenomenon will appear when assembling a further rotor component to the mating member 34, given the intrinsic offset h and wedge angle $\alpha$ of this further rotor component, and wedge angle $\beta$ of the rotor component 30 which receives it, and that these successive offsets can have an additive, and even amplifying effect, because even a relatively small inclination of mating member 32 due to the mating wedge angles at that end can cause a significant offset between the opposite mating member 34 and the rotation axis 11 of the rotor assembly.

Accordingly, care must be taken to avoid scenarios where the wedge angles and center of mass offset of successive components amplify one another's effect on the rotation dynamics. The more rotor components there are in a given rotor assembly, the more combinations of circumferential orientations there are, and if attempting to address the dynamic response by careful selection of the combination of circumferential orientations of individual rotor components, the resulting 3D puzzle can have a significant complexity.

The "puzzle" can be addressed by first ascertaining the geometrical data about the individual rotor components (wedge angles, intrinsic center of mass offset), and by determining a relative circumferential orientation for each component in the stack.

An intuitive approach to balancing the rotor assembly would be to seek to compensate the "positive" imperfections of first ones of the components in the stack by "negative" imperfections in one or more successive components in the stack. For instance, the relative circumferential orientations can be determined in a manner for the offset of the center of mass of the second component in the stack to be in an opposite orientation than the offset of the center of mass of the first component in the stack, in a manner for the overall center of mass of the rotor assembly to be as close as possible to the rotation axis 11 of the rotor assembly (e.g. 20 or 22). This approach is exemplified in FIGS. 3A, 3B and 3C.

Figure 3A:
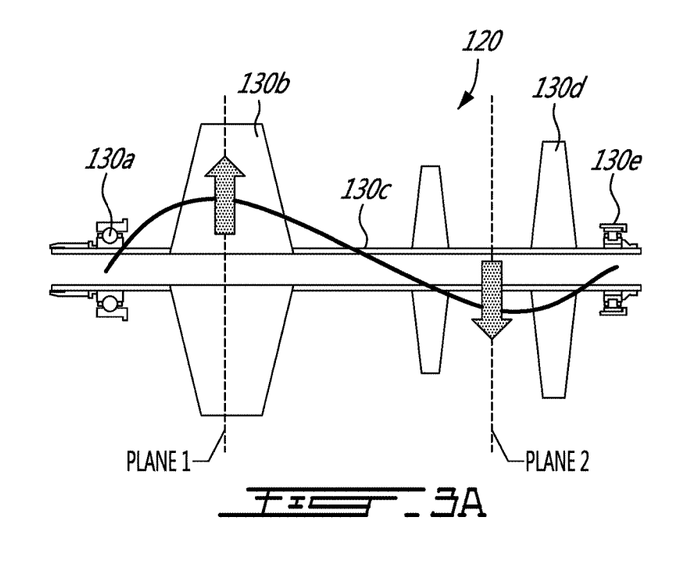
FIG. 3A is a schematic view showing a "corkscrew" runout configuration, with FIG. 3B being a graph plotting the runout values and FIG. 3C a graph plotting a simulated dynamic response thereof.
Figure 3B:
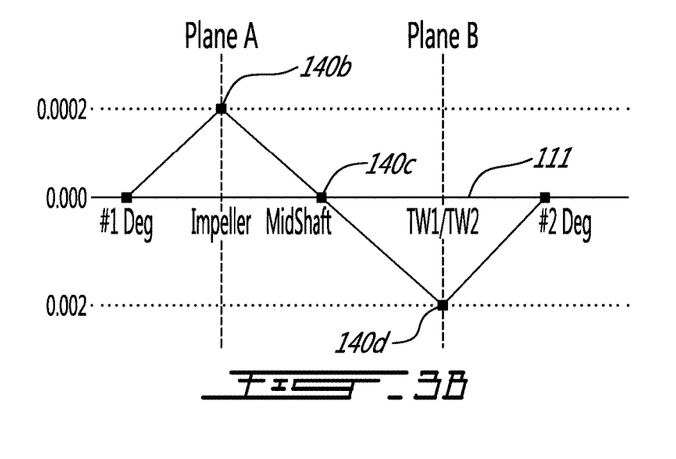
Figure 3C:
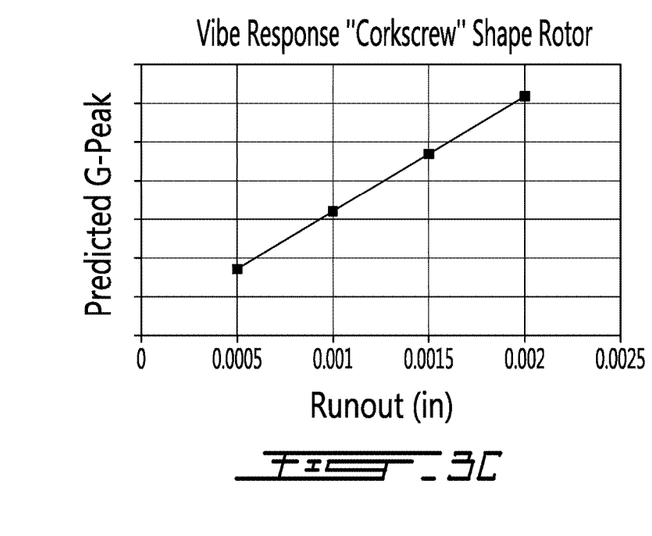

In the example shown in FIGS. 3A, 3B and 3C, the rotor assembly 120 consists of a stack including a #1 bearing 130a, an impeller 130b, a midshaft 130c, a two-stage turbine 130d, and a #2 bearing 130e. The circumferential orientation of the impeller 130b relative to the #1 bearing 130a is selected in a manner for the center of mass 140b of the impeller 130b to be offset by 0.002 inches along the Y axis relative to the rotor assembly's rotation axis 111. The circumferential orientation of the successive components is selected in a manner for the center of mass 140c of the midshaft 130c to coincide with the rotation axis 111 of the assembly 120, within measuring tolerances, and for the center of mass 140d of the turbine 130d to have a negative, balancing offset, in this case of −0.002 inches along the Y axis, essentially compensating for the offset of the center of mass 140b of the impeller 130b. The resulting rotor assembly 120 has a total center of mass which is aligned with the axis 111 of the assembly 120, within measuring tolerances. This type of configuration of centers of masses 140b, 140c, 140d, along the stack or sequence of rotor components 130a, 130b, 130c, 130d, 130e will be referred to herein as a zig-zag or corkscrew configuration, and is characterized by the fact that in the plane of the main amplitude of center of mass offset (which is the illustrated Y-Z plane in this example, assuming that the centers of mass are much more closely located relative to the rotation axis in the X-Y plane), the direction of the offset of the centers of mass, or runout, alternates from one side of the rotation axis 111 to the other along the stack, when plotted in a graph such as FIG. 3B, leading to a relatively small runout when considering the rotor assembly 120 in its entirety.

A dynamic response computer model of this configuration yielded the graph shown at FIG. 3C, wherein the amplitude of the runout was found to be strongly correlated to the predicted G-Peak at operating RPM's.

Figure 4A:
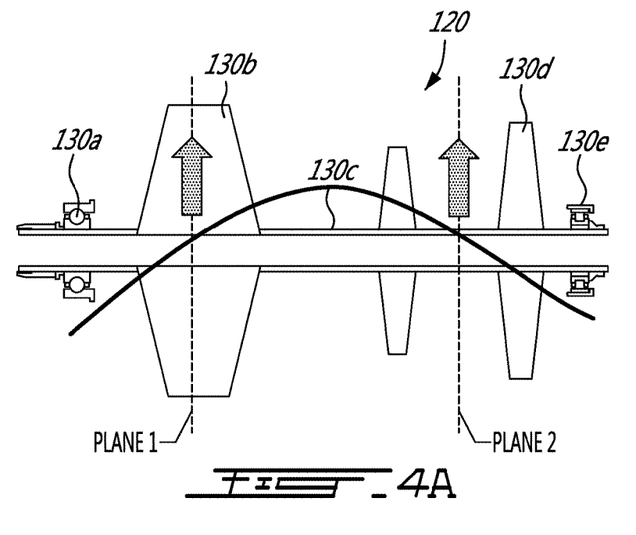
FIG. 4A is a schematic view showing a "bow" runout configuration, with FIG. 4B being a graph plotting the runout values and FIG. 4C a graph plotting a simulated dynamic response thereof.
Figure 4B:
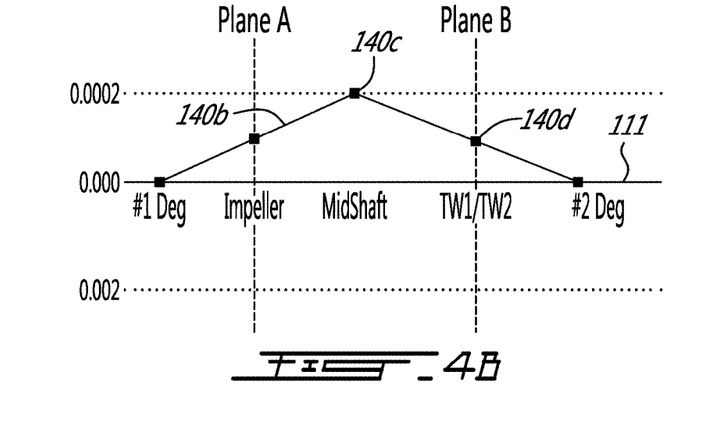
Figure 4C:
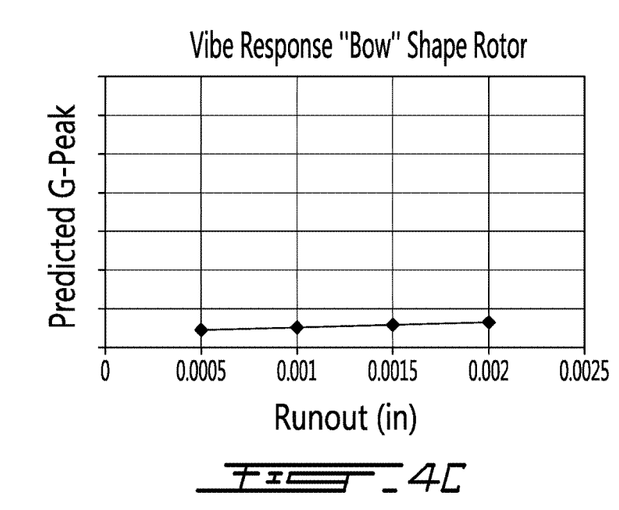
Figure 5A:
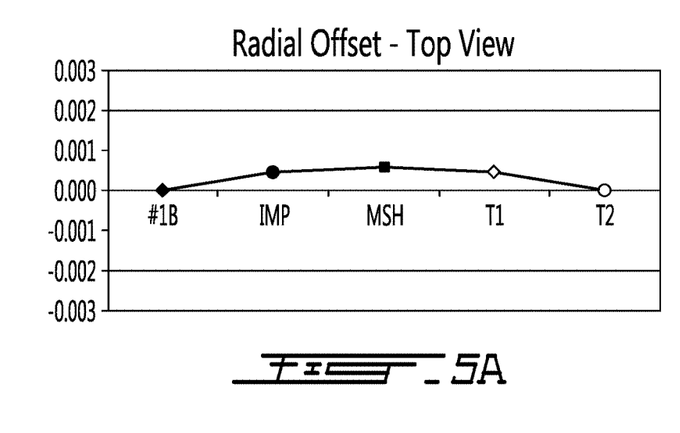
FIGS. 5A, 5B and 5C are graphs plotting runout values of another example "bow" runout configuration, and more precisely a top view, a side view, and a front view, respectively.
Figure 5B:
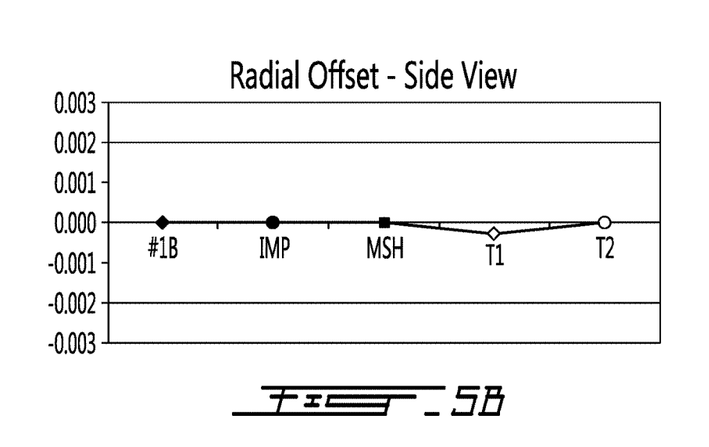
Figure 5C:
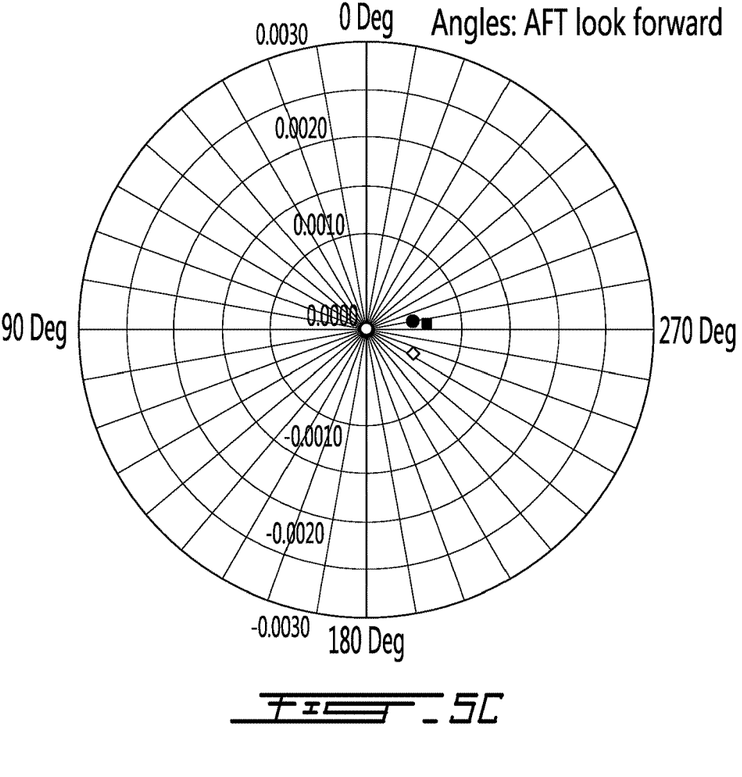

Counter-intuitively, it was found that a combination of relative circumferential positions where the centers of mass 140b, 140c, 140d of the individual rotor components 130a, 130b, 130c, 130d, 130e formed a bow shape, a first example of which is presented at FIG. 4A, 4B, and a second example of which is presented at FIGS. 5A, 5B, 5C, can have a predicted G-Peak response significantly less affected by runout amplitude, as shown in FIG. 4C, and can thus be preferable to a corkscrew configuration at least in some embodiments. This type of configuration of centers of masses along the stack or sequence of rotor components 130a, 130b, 130c, 130d, 130e will be referred to herein as a "bow" shape, and is characterized by the fact that in the plane of the main amplitude of center of mass offset (the Y-Z plane illustrated in FIGS. 4A and 4B again in this example and the top view of FIG. 5A in the corresponding example), the amplitude of the offset of the centers of mass, or runout, increases, and then decreases along the axial sequence, reaching its maximum amplitude in an intermediate one of the rotor components of the stack, such as the midshaft in the specific examples illustrated. One aspect which can make this solution counter intuitive is that the center of mass offset, or runout, of the rotor assembly taken as a whole can be significantly greater in this scenario than in the corkscrew configuration, yet, since the rotor dynamic response can be less strongly correlated to the amplitude of the runout, where a couple unbalance between compressor and turbine can be present, the dynamic response can be better in the former configuration than in the latter configuration. Indeed, it was found that at least in the case of some aircraft engines, at full operating speeds, this couple unbalance can result in very high vibrations resulting in the engine not passing the vibration acceptance tests.

In practice, given the amount of rotor components and the quantity of possible relative circumferential orientations (curvic couplings typically limit the circumferential orientations to a limited set, but some interference fits can allow a significantly greater flexibility in terms of selected circumferential orientation), a large amount of potential combinations are possible, and simulating all the available combinations using a computer can lead to a number of "bow shape" solutions. In situations where more than one "bow shape" solution is available, the bow shape solution having lowest maximum runout can be selected, for instance, in an aim to optimize the configuration for the given set of rotor components.

Indeed, using dynamic response computer model analysis, the optimal unbalance alignment can be to align the compressor rotor and the turbine rotors residual unbalance in-phase and to stack the rotor parts by aligning the individual component such as the unbalance is additive, creating a 'bowed-shape" spool and resulting in a "inphase unbalance" for the rotor spool end-to-end. (FIG. 5)

Accordingly, and more generally, for assembling a plurality of rotor components (typically at least three) into a rotor assembly, one can begin by obtaining geometrical data about the individual rotor components. This can be achieved by measuring the wedge angles at the mating members and determining intrinsic runout (center of mass offset) for each component of the stack. Then, a computer can simulate the different possible combinations of circumferential orientations for the different rotor components in the stack, taking into consideration the geometrical data obtained about the specific set of rotor components to assemble. This simulation can produce a number of different solutions, in which the solutions are each characterized by a given runout configuration. Some of these runout configurations can be corkscrew shaped, for instance, whereas others can be bow shaped. A combination of relative circumferential orientations leading to a bow shape can be selected, and more specifically, if more than one bow shape solution is available, one of these which is considered as producing the lowest overall runout can be selected, and the rotor components can then be assembled to one another according to this selected solution, by "clocking" the individual rotor components to corresponding circumferential orientations, in a manner for the rotor assembly formed by the resulting axially-sequenced stack to correspond to the selected solution. It will be understood that a process which includes simulating a wide variety of potential solutions before selecting a given one is only one possible way of automating the process, and that there can be alternate ways to satisfy oneself that a selected bow shape configuration is satisfactory in the circumstances at hand.

The procedure can thus require the following steps:
Measuring the rotors mating members eccentricity and squareness to identify the wedge orientation,
Measuring the rotors imbalance value and orientation, and
Rotating the successive ones of the rotor components around their intrinsic axis until a reference feature of the rotor component matches a circumferential reference of the rotor assembly, and then maintaining the circumferential angle of the reference feature fixed until the rotor component is assembled into the rotor assembly.

The operation of determining a combination of relative circumferential positions of the individual rotor components which forms the selected bow shape configuration can be computer-implemented, in which case it can include, for a given set of possible relative circumferential orientations of each of the rotor components, and using the geometrical reference values obtained, simulating configurations of the centers of masses corresponding to a plurality of different combinations of said relative circumferential orientations, and determining a bow shape feature of at least one of the simulated configurations. More specifically, in one example, the method can include identifying the bow shape feature in a plurality of simulated configurations, and determining, among the simulated configurations having the bow shape feature the one having the smallest overall runout, in which case the assembly of the rotor can be performed according to the solution identified as having the smallest overall runout.

If the simulations are performed by simulating all possible combinations, a number of possible circumferential orientations for each rotor component can be determined. In the case of a curvic coupling, the possible circumferential orientations can be in the form of a limited set determined by the specificities of the curvic coupling. However, if the engagement between rotor components is a simple cylindrical interference fit, it can be preferable to select a number of possible circumferential orientations from the continuum of possible circumferential orientations. This can involve limiting the set of possible circumferential orientations to 360 possible circumferential orientations, interspaced by one degree from one another for instance, or any alternate finite set of possible circumferential orientations found suitable given the specifics of the application.

Accordingly, a computer program product can be stored on computer readable memory and designed to perform the operation of determining a combination of relative circumferential positions of the individual rotor components to form a suitable bow shape, based on geometrical data to be inputted.

In the context of an example such as presented above, for instance, the minidisc can have significantly smaller weight but since it is in the middle of the spool, its geometry can greatly affect the spool geometry, and can be indexed to achieve desired spool shape. Accordingly, the computer program can allow a user to input part geometry data, establish spool rotation centerline using two bearing journals one located at front shaft of impeller and the other one at the rear shaft of turbine disc 2, and display the eccentricity of each rotor in a rotor plot. The software can then use the turbine disc unbalance angles to force spool eccentricity on the same side of the centerline (bowed spool), and on this basis, the softward can determine an optimal minidisc index (circumferential position) to achieve minimal spool bow shape.

Subsequently to the assembly of the rotor assembly with the clocked rotor components, the runout at different planes corresponding to individual ones of the rotor components, for instance, can be measured. Moreover, the rotor assembly can be rotated at operating speeds on a test bed, and vibrations can be measured and checked against design tolerances or threshold levels, for instance.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of assembling a rotor assembly of a gas turbine engine, the rotor assembly including at least three rotor components assembled to one another in an axially-extending sequence, each rotor component having a center of mass, the method comprising:
   obtaining geometrical reference values about the individual rotor components;
   based on the geometrical reference values, determining a combination of relative circumferential positions of the individual rotor components associated to a bow shape configuration of the centers of mass along the axially-extending sequence in which offsets of the centers of mass relative to a rotation axis of the rotor assembly increase away from an end of the axially-extending sequence to a maximum offset of the offsets and decrease from the maximum offset toward an opposite end of the axially-extending sequence, the centers of mass being offset relative to the rotation axis in a same radial direction; and
   assembling the rotor components to one another in said determined combination of relative circumferential positions, into the rotor assembly.

2. The method of claim 1 wherein each one of the rotor components has two mating members, one at each axial end thereof, the geometrical reference values include wedge angles and intrinsic offsets of both mating members.

3. The method of claim 2 wherein at least some of the mating members include a curvic coupling.

4. The method of claim 1 wherein the bow shape configuration includes rotor components located closer to the axial ends of the sequence having progressively lower overall runout relative to rotation axis of the rotor assembly than components located closer to the center of the axial sequence, when measured in a transversal plane in which the runout is maximal.

5. The method of claim 1 wherein the step of assembling includes aligning an intrinsic axis of successive ones of the rotor components with a rotation axis of the rotor assembly, rotating the successive ones of the rotor components around their intrinsic axis until a reference feature of the rotor component matches a circumferential reference of the rotor assembly, and then maintaining the circumferential angle of the reference feature fixed until the rotor component is assembled into the rotor assembly.

6. The method of claim 1 wherein the step of determining a combination of relative circumferential positions of the individual rotor components is computer-implemented, and includes, for a given set of possible relative circumferential orientations of each of the rotor components, and using the geometrical reference values obtained, simulating configurations of the centers of masses corresponding to a plurality of different combinations of said relative circumferential orientations, and determining a bow shape feature of at least one of said simulated configurations.

7. The method of claim 6 wherein the method includes determining a bow shape feature of a plurality of said simulated configurations, and determining, among the simulated configurations determined to have the bow shape feature, one of said simulated configurations determined to have the smallest overall runout; wherein the assembling of the rotor components is performed according to the simulated configuration determined to have the smallest overall runout.

8. The method of claim 6 wherein the given set of possible relative circumferential orientations include a plurality of relative circumferential orientations corresponding to circumferential orientations allowed by curvic couplings between adjacent ones of the rotor components.

9. The method of claim 6 wherein the given set of possible relative circumferential orientations include a subset of circumferential orientations determined within a continuum of possible circumferential orientations allowed by an interference fit.

10. The method of claim 1 wherein the step of assembling includes axially compressing the rotor components of the sequence axially to form interference fits between at least some of the rotor components of the sequence.

11. The method of claim 1 further comprising measuring the runout of individual ones of the assembled rotor components relative to a rotation axis of the rotor assembly.

12. The method of claim 1 further comprising rotating the rotor assembly at operating rotation speeds, measuring the vibrations, and comparing the measured vibrations to threshold levels.

13. A rotor assembly comprising at least three rotor components assembled to one another in an axially-extending sequence, each rotor component having a center of mass, wherein the centers of mass of the rotor components forms a bow shape configuration along the axially-extending sequence in which offsets of the centers of mass relative to a rotation axis of the rotor assembly increase away from an end of the axially-extending sequence to a maximum offset of the offsets and decrease from the maximum offset toward an opposite end of the axially-extending sequence, the centers of mass being offset relative to the rotation axis in a same radial direction.

14. The rotor assembly of claim 13 wherein the bow shape configuration includes rotor components located closer to the axial ends of the sequence having progressively lower overall runout relative to rotation axis of the rotor assembly than components located closer to the center of the axial sequence, when measured in a transversal plane in which the runout is maximal.

15. The rotor assembly of claim 13 wherein at least some of the rotor components are interference-fitted with an adjacent one of the rotor components in the axial sequence.

* * * * *